(12) United States Patent
Reid

(10) Patent No.: US 8,134,651 B1
(45) Date of Patent: Mar. 13, 2012

(54) TELEVISION FRAME DEVICE

(76) Inventor: Donald J. Reid, Smithtown, NY (US)

( * ) Notice: Subject to any disclaimer, the term of this patent is extended or adjusted under 35 U.S.C. 154(b) by 400 days.

(21) Appl. No.: 12/407,736

(22) Filed: Mar. 19, 2009

(51) Int. Cl.
  *H04N 5/64* (2006.01)
  *A47B 81/06* (2006.01)

(52) U.S. Cl. .................. 348/841; 348/836; 312/7.2

(58) Field of Classification Search .......... 348/836–843; 312/7.2; 345/109, 905
  See application file for complete search history.

(56) References Cited

U.S. PATENT DOCUMENTS

| | | | | |
|---|---|---|---|---|
| 2,173,664 A * | 9/1939 | Shutts | ............... | 52/786.1 |
| 3,302,351 A * | 2/1967 | Trulaske | ............... | 52/309.1 |
| 3,418,426 A * | 12/1968 | Kummel et al. | ............... | 348/823 |
| 3,466,777 A * | 9/1969 | Wistrand et al. | ............... | 40/605 |
| 3,482,347 A * | 12/1969 | Reibold | ............... | 40/622 |
| 3,802,102 A * | 4/1974 | Licciardi | ............... | 40/564 |
| 3,811,214 A * | 5/1974 | Tate | ............... | 40/782 |
| 4,002,831 A * | 1/1977 | Aeschliman | ............... | 348/836 |
| 4,329,716 A * | 5/1982 | Porco | ............... | 348/786 |
| 4,630,386 A * | 12/1986 | Wilson | ............... | 40/734 |
| 5,119,271 A * | 6/1992 | Aoki et al. | ............... | 361/679.61 |
| 5,264,765 A * | 11/1993 | Pecorino et al. | ............... | 318/265 |
| 5,377,434 A * | 1/1995 | Wilson | ............... | 40/611.06 |
| 5,564,209 A * | 10/1996 | Zagnoli | ............... | 40/594 |
| 5,878,694 A * | 3/1999 | Irwin | ............... | 119/452 |
| 5,887,959 A * | 3/1999 | Yuri | ............... | 312/7.2 |
| 6,294,724 B1 * | 9/2001 | Sasaoka et al. | ............... | 136/251 |
| 6,300,555 B1 * | 10/2001 | Kondo et al. | ............... | 136/244 |
| 6,550,172 B2 * | 4/2003 | Korpai | ............... | 40/725 |
| 6,977,627 B1 * | 12/2005 | Dalton | ............... | 345/1.1 |
| D565,518 S | 4/2008 | Tu | | |
| 7,495,633 B2 * | 2/2009 | Oku et al. | ............... | 345/2.3 |
| 7,568,316 B2 * | 8/2009 | Choby et al. | ............... | 52/203 |
| 7,623,341 B1 * | 11/2009 | Salvat et al. | ............... | 361/679.01 |
| 7,808,563 B2 * | 10/2010 | Sanchez | ............... | 348/818 |
| 7,884,814 B1 * | 2/2011 | Graham | ............... | 345/204 |
| 2002/0185940 A1 * | 12/2002 | An | ............... | 312/7.2 |
| 2002/0196380 A1 * | 12/2002 | Senkler | ............... | 348/836 |
| 2003/0214527 A1 | 11/2003 | Paul | | |
| 2004/0150943 A1 * | 8/2004 | Rock | ............... | 361/681 |
| 2006/0130773 A1 | 6/2006 | Shawver et al. | | |
| 2006/0208619 A1 | 9/2006 | McLin et al. | | |
| 2007/0056201 A1 * | 3/2007 | Price et al. | ............... | 40/725 |
| 2007/0188056 A1 | 8/2007 | Chang | | |
| 2008/0093956 A1 | 4/2008 | Maxson | | |
| 2010/0060807 A1 * | 3/2010 | Green et al. | ............... | 348/836 |
| 2010/0136282 A1 * | 6/2010 | Moss | ............... | 428/99 |

\* cited by examiner

*Primary Examiner* — Robert Canfield
*Assistant Examiner* — Charissa Ahmad

(57) ABSTRACT

A television frame device for wrapping around a flat screen television to display a picture or a poster in front of the television comprising a first panel, a second panel, a third panel, and a fourth panel, each panel having a generally U-shaped cross section, wherein the panels together form a generally rectangular frame for placing around the television such that the front surface of each of the panels is in front of the television and the back surface of each of the panels is behind the television. The television frame device further comprises a U-shaped secondary track disposed on the front surface of each of the panels, wherein the U-shaped secondary track is for receiving the picture or the poster.

2 Claims, 3 Drawing Sheets

TELEVISION FRAME DEVICE

FIELD OF THE INVENTION

The present invention is directed to a device for framing a flat screen television.

BACKGROUND OF THE INVENTION

Television owners may wish to modify the décor of the front of their televisions. The present invention features a television frame device that can provide a user a means of decorating his/her television. The television frame device generally comprises a pair of tracks that can be attached to the sides or the top of the television. The tracks can hold a decorating piece, such as a picture, a painting, etc.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figures 1, 2:
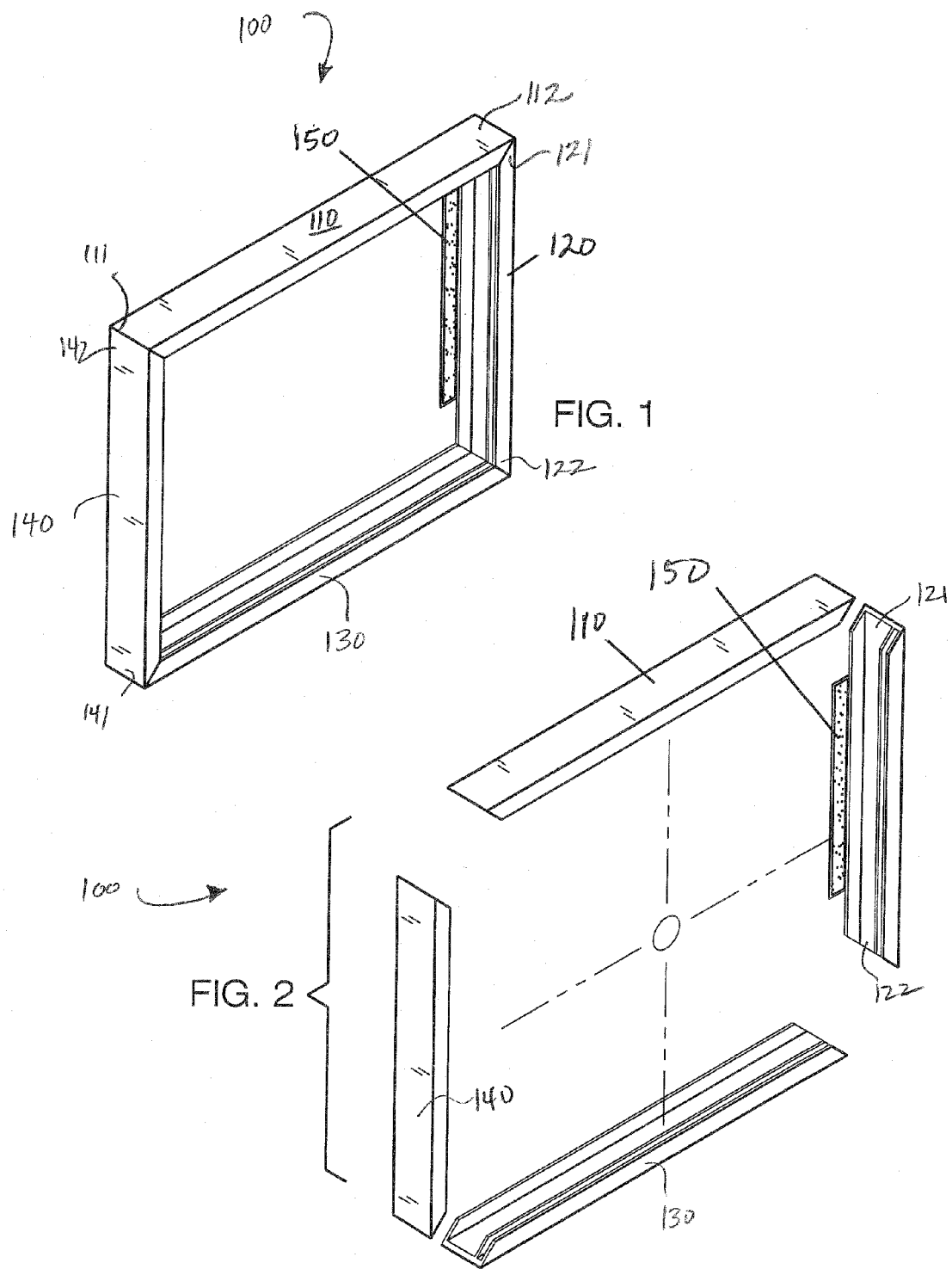
FIG. 1 is a perspective view of the television frame device of the present invention.
FIG. 2 is an exploded view of the components of the television frame device of the present invention.
Figure 3:
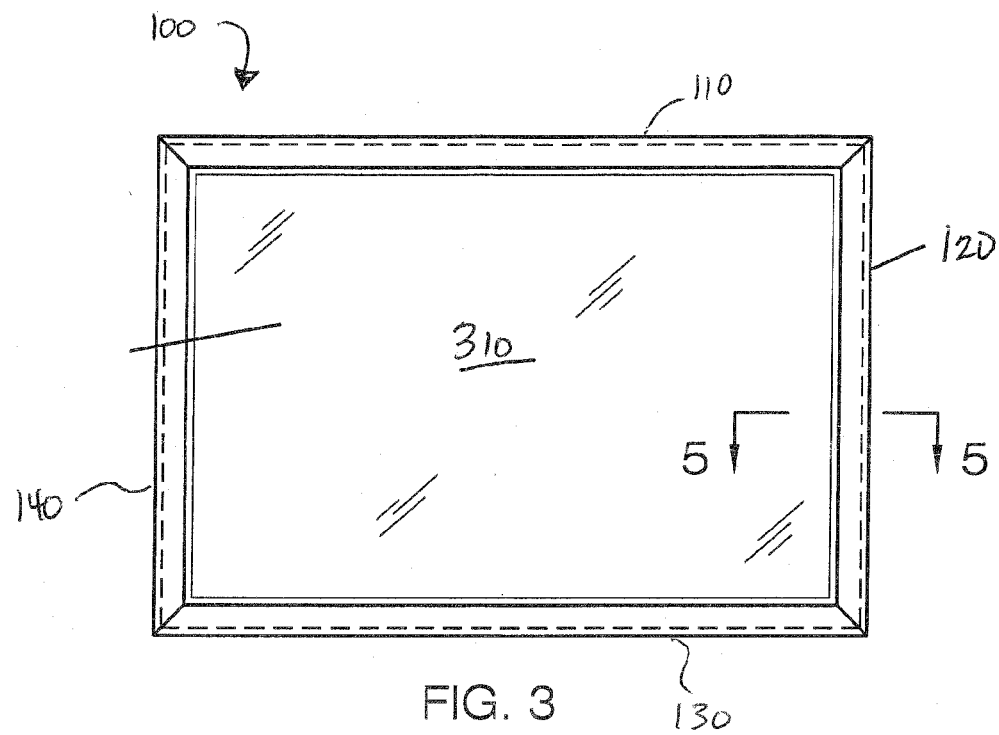
FIG. 3 is a front view of the television frame device of the present invention.
Figure 4:
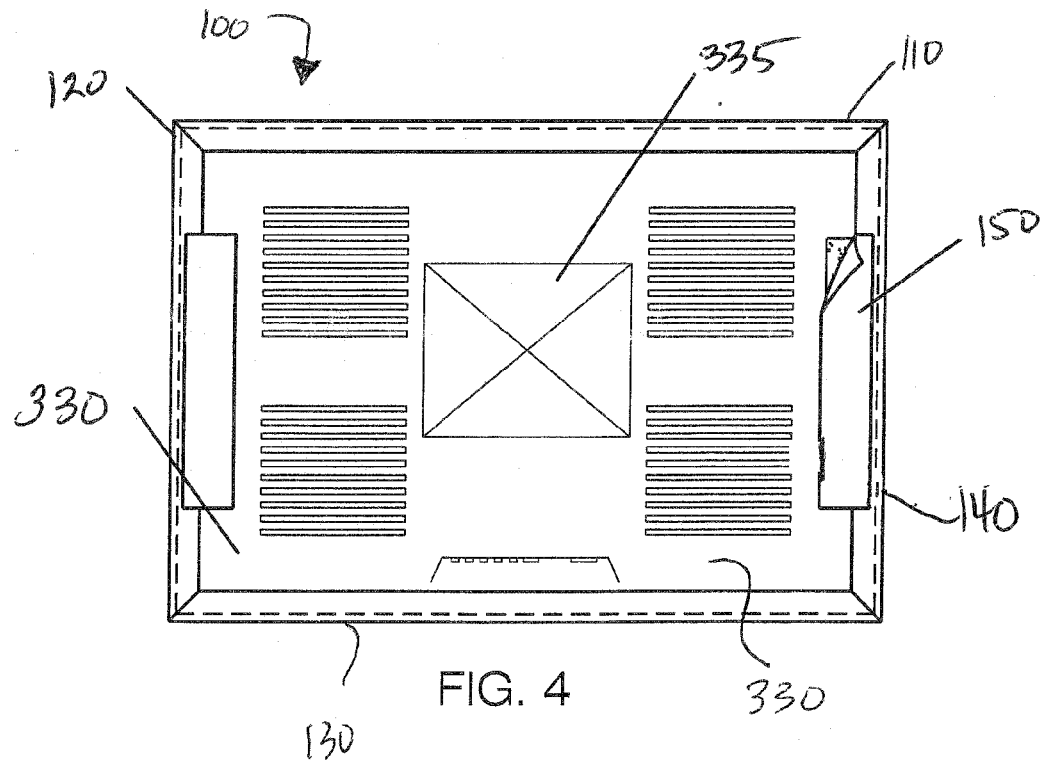
FIG. 4 is a back view of the television frame device of the present invention.
Figure 5:
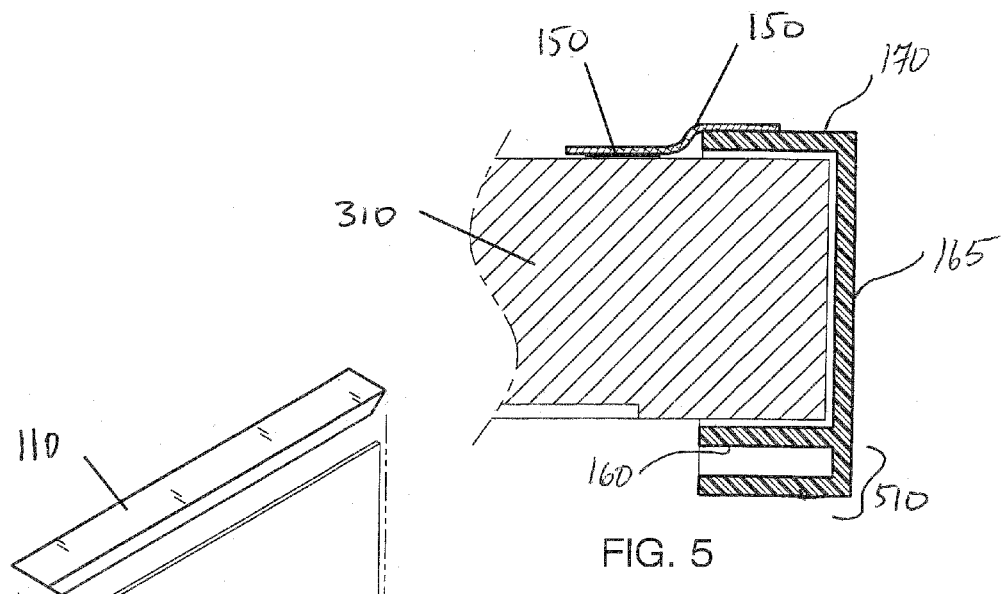
FIG. 5 is a side cross sectional view of the television frame device of the present invention.
Figure 6:
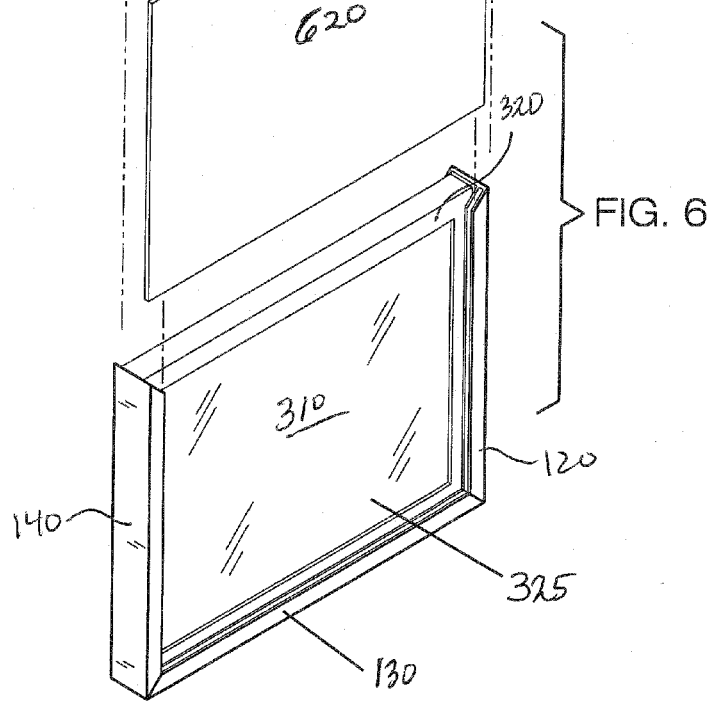
FIG. 6 is a perspective view of the television frame device of the present invention.

The following is a listing of numbers corresponding to a particular element refer to herein:
- 100 television frame device
- 110 first panel
- 111 first end of first panel
- 112 second end of first panel
- 120 second panel
- 121 first end of second panel
- 122 second end of second panel
- 130 third panel
- 140 fourth panel
- 141 first end of fourth panel
- 142 second end of fourth panel
- 150 hook-and-loop fastener
- 160 front surface of panel
- 165 side of panel
- 170 back surface of panel
- 310 television
- 320 front surface of television
- 325 screen of television
- 330 back surface of television
- 335 mounting device of television
- 510 secondary track
- 620 picture Referring now to FIG. 1-6, the present invention features a television frame device 100. The television frame device 100 comprises a first panel 110, a second panel 120, a third panel 130, and a fourth panel 140, that together from a generally rectangular frame component. Each panel has a first and second end and can be interlocked. For example, the first end 111 of the first panel 110 connects to the second end 142 of the fourth panel 140. The second end 112 of the first panel 110 connects to the first end 121 of the second panel 120.

The frame component is for wrapping around a flat panel television 310. Flat panel televisions 310 are well known to one of ordinary skill in the art. The televisions 310 have a front surface 320 with a screen 325, a back surface 330 with a mounting device 335, and sides. In some embodiments, the television frame device 100 may be used to decorate the television 310. The television frame device 100 may be constructed in a variety of sizes to accommodate various size televisions.

The television frame device 100 may be constructed from a variety of materials. In some embodiments, the television frame device 100 is constructed from a material comprising a plastic (e.g., injection-molded plastic).

Each panel has a generally U-shaped cross section. Each panel has a front surface, a side, and a back surface. The television frame device 100 is placed around a television 310 such that the front surface 160 of the panels is in front of the television 310, the back surface 170 is in back of the television 310, and the sides 165 are on the sides of the television 310 (see FIG. 3, FIG. 4).

Disposed on the back surface 170 of the panels is a hook-and-loop fastener 150. The hook-and-loop fastener 150 is for securing the television frame device 100 to the back surface 330 of the television 310. For example, a first half of the hook-and-loop fastener 150 is attached to the back surface 330 of the television 310, the first half of the hook-and-loop fastener 150 to the a panel, and the two halves can be attached together to attach the panel to the television 310.

Disposed on the front surface 160 of the panels is a secondary track 510. The secondary track 510 has a generally U-shaped cross section, and is for allowing a user to insert a picture 620, a poster, or other similar item into the panels to cover the front surface of the television 310.

The following the disclosures of the following U.S. Patents are incorporated in their entirety by reference herein: U.S. Pat. Application No. 2007/0188056; U.S. Pat. Application No. 2003/0214527; U.S. Pat. Application No. 2006/0208619; U.S. Pat. Application No. 2006/0130773; U.S. Pat. Application No. 2008/0093956.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A frame device for wrapping around a flat screen television to display a picture or a poster in front of the television, said television frame device comprising:
   (a) a first panel having a generally U-shaped cross section, the first panel having a first end, a second end, a front surface, a side, and a back surface;

(b) a second panel having a generally U-shaped cross section, the second panel having a first end, a second end, a front surface, a side, and a back surface;

(c) a third panel having a generally U-shaped cross section, the third panel having a first end, a second end, a front surface, a side, and a back surface;

(d) a fourth panel having a generally U-shaped cross section, the fourth panel having a first end, a second end, a front surface, a side, and a back surface; wherein the panels together form a generally rectangular frame such that the first end of the first panel can be interlocked with the second end of the fourth panel, the second end of the first panel can be interlocked with the first end of the second panel, the second end of the second panel can be interlocked with the first end of the third panel, and the second end of the third panel can be interlocked with the first end of the fourth panel;

(e) a hook-and-loop fastener disposed on the back surface of each of the panels, wherein the hook-and-loop fastener is for securing the frame device to a back surface of the television; and (f) a generally U-shaped secondary track disposed on the front surface of each of the panels, wherein the U-shaped secondary track is for receiving the picture or the poster;

(g) wherein the frame device is placed around the television such that the front surface of each of the panels is in front of the television and the back surface of each of the panels is behind the television.

2. The frame device of claim 1, wherein the panels can be interlocked via a hook-and-loop fastener, a snap mechanism, a hook mechanism, or a combination thereof.

* * * * *